United States Patent [19]

Schumacher, deceased et al.

[11] Patent Number: 4,960,328

[45] Date of Patent: Oct. 2, 1990

[54] APPARATUS FOR THE EXTRUSION, EXPANSION AND/OR THERMAL TREATMENT OF SUBSTANCES AND SUBSTANCE MIXTURES

[76] Inventors: Heinz O. Schumacher, deceased, late of Hamburg; by Walter H. Schumacher, executor, Höperfeld 26, 2050 Hamburg 80, both of Fed. Rep. of Germany

[21] Appl. No.: 234,041

[22] Filed: Aug. 19, 1988

[30] Foreign Application Priority Data

Aug. 21, 1987 [EP] European Pat. Off. ........ 87112120.8

[51] Int. Cl.$^5$ ............................ B01F 7/08; B29B 7/42
[52] U.S. Cl. ........................................ 366/80; 366/90; 366/307; 366/322
[58] Field of Search .................. 366/80, 90, 99, 76, 366/302, 150, 303, 177, 307, 322, 318, 79, 324; 425/204, 208, 209; 100/117, 145, 150, 37, 93.5; 99/348, 483

[56] References Cited

U.S. PATENT DOCUMENTS

| | | | |
|---|---|---|---|
| 12,127 | 1/1855 | Gore | 366/307 X |
| 1,184,016 | 5/1916 | Price | 366/80 |
| 2,997,943 | 8/1961 | Zies | 100/117 X |
| 3,108,530 | 10/1963 | Zies | 100/93.5 X |
| 3,169,752 | 2/1965 | Laubarede | 366/81 X |
| 3,170,190 | 2/1965 | Fields | 366/81 X |
| 3,255,220 | 6/1966 | Baer et al. | 241/8 X |
| 3,478,679 | 11/1969 | Bauserman | 100/117 |
| 3,535,412 | 10/1970 | Driscoll | 425/209 X |
| 3,938,783 | 2/1976 | Porter | 366/307 X |
| 4,024,168 | 5/1977 | Homann et al. | 100/117 X |
| 4,119,025 | 10/1978 | Brown | 425/204 X |
| 4,155,690 | 5/1979 | Checkland et al. | 264/211 X |
| 4,199,263 | 4/1980 | Menges et al. | 366/90 |
| 4,429,628 | 2/1984 | Koch et al. | 100/150 X |
| 4,538,917 | 9/1985 | Harms | 366/75 |
| 4,581,992 | 4/1986 | Koch | 366/90 X |
| 4,657,499 | 4/1987 | Lewellan et al. | 366/90 X |
| 4,723,901 | 2/1988 | Sarumaru | 425/208 |

FOREIGN PATENT DOCUMENTS 2230530  1/1974  Fed. Rep. of Germany.
3613612 11/1986  Fed. Rep. of Germany.

Primary Examiner—Harvey C. Hornsby
Assistant Examiner—Scott J. Haugland
Attorney, Agent, or Firm—Lane, Aitken & McCann

[57] ABSTRACT

For the improvement of the reaction and mixing effects of extruders, expanders and similar devices, as well as for the increase of the energy yield, the so-called scraper fingers (1) employed in such devices are provided with flats or recesses (4'). In addition, the scraper fingers (1) are disposed rotatably around an angle, so that the surface facing the advanced product in the screw space (12) can be varied. The twisting is adjustable from the outside of the jacket of the apparatus. The fingers (1) have at least one center bore (6), from which there issue side bores (8) in optional directions. In addition to a flat or recess (4'), the fingers (1, 4) can also have twisting (4') within themselves.

10 Claims, 4 Drawing Sheets

APPARATUS FOR THE EXTRUSION, EXPANSION AND/OR THERMAL TREATMENT OF SUBSTANCES AND SUBSTANCE MIXTURES

BACKGROUND OF THE INVENTION

The invention concerns the improvement of the effect of the process technique and the practicability of so-called extruders, expanders or similar apparatus, especially for the thermal treatment of substances and substance mixtures, particularly in the food industry, feed industry and fertilizer industry. However, the invention is also advantageous inn the same manner in the pharmaceutical field, as well as for the production and processing of plastic articles.

Individual products and compounds, but also substance mixtures, are subjected to a reaction or a treatment under specified process parameters, such as contact time, temperature, pressure, quantity ratios, etc., and are subsequently expelled from a continuously operating system, optionally under simultaneous relaxation and/or shaping. For the continuous advance of material through a reaction or treatment zone, there are used, preferably if not exclusively, screw elements, including double or multiple screws, which are horizontally disposed in a closed system, such as an extruder. The screw channels defined by the screw elements can change within the system to allow adjustment for transporting different materials and for different contact times as well as altogether variable and differentiated reaction conditions.

It is known to insert so-called scraper fingers or breaker rods, which are oriented radially from an inner surface of a screw casing, or jacket, which extends in the direction of the screw shaft, in order to provide for the mechanical lifting of material during the continuous transport of material through the screw volume. Such scraper fingers serve for the constant lifting or break-up of soft or semiplastic material, as well as agglomerated material, during the continuous passage of the material through the treatment zone so as to assure an optimum renewal of the surface and, thus, to assure that the treatment process can be carried out as intended. The mechanical lifting of the material with the simultaneous renewal of the surface is necessary particularly when the material or products tend to cake or adhere, in order to prevent a strand from forming and the product from merely advancing through the screw space without the desired turning over, i.e., admixing, reacting, homogenization, treatment, etc. By the use of the scraper fingers or breaker rods, it is widely assured that, depending on the material properties, such as viscosity, hardness, flowability, etc., and also on further process parameters, the deficiencies indicated above are substantially eliminated, or at least are opposed.

The risk of formation of cakes, plastic or semiplastic lumps, strands, etc. during the passage of the material through the treatment zone defined by extruder, expander, or the like, is always present when the product or the material mixture passes, for instance, through a change in its state of aggregation (melting, condensation, solidification, etc.) or when it is worked in a humid atmosphere or one containing solvents, or when changes of viscosity take place as a consequence of the reaction. This is the case when, for instance, among other things, during the processing of foodstuffs, such as noodle or meat products, there occur rheological changes of material, or when feed, or oily or fatty products are extruded at temperatures which are in the range of the melting or saturation of the material so that an agglomeration or caking of the products or the material mixture can hardly be avoided. Only as an example, the so-called thermic conditioning of oilseeds in preparation for solvent extraction is particularly salient. In this treatment in continuous operation, easily plastifiable natural products, such as soybeans and others are quickly compressed and compacted in an hydrated atmosphere and therefore transported then only as a swelling without the desired effects of temperature and humidity taking place to the best. Similar observations were made in the processing of feed mixtures, of starch-containing material or of fertilizer batches, where, particularly with protein-and starch-containing products and when working in a humid atmosphere, additional problems were created due to smudging of the material.

In order to assure the constant changing of the surface of the material during the transport of material through the treatment zone, for example, through the screw volume of an extruder, expander, or the like, which constant changing is required for an optimum turning over of the material and, at the same time, in order to oppose the formation of smudgings, cakes, strands, etc., it has been proposed, as already mentioned above, to insert into the screw volume or into the treatment zone, scraper fingers or breaker rods. These are rigidly attached on the inner wall of the jacket of the apparatus (expander, etc.) and radially oriented toward the screw shaft. Rod-like solid bodies (fingers) which have a circular area of cross-section and may have central bores are involved (see German DE 23 35 333385 or U.S. Pat. No. 3,255,220). The rigid location or attachment of such scraper fingers proved disadvantageous, since it did not permit a modification of the transport path of the material to be treated while the system was in operation or even during the interruption of operation. An unfavorable configuration or habit permitted only a laminar flow of the products around the rods or pins, and the great number of the rods or pins required an extremely high driving power from the screw motor, all the more since they were rigidly mounted. A constantly repeating mixing effect, constant renewal of the product surface, mechanical lifting of the material, crushing of the material or formations of crumbs, and prevention of the formation of merely transported lumps or strands, particularly when working in humid atmosphere or in the temperature range of phase transitions, was only restrictedly possible with the known apparatus.

SUMMARY OF THE INVENTION

An object of the present invention is to improve the scraper fingers in their shape and, by doing so, to improve as a whole the power yield of the screw system in extruders, expanders and similar apparatus.

Another object of the present invention is to increase the mixing effect in the screw space and, by doing so, to optimize the respective reaction taking place.

It is a further object of the present invention that, depending on the chemical and rheological characteristics of the material to be treated, the positioning of the scraper fingers in the continuous operation can be varied, by which influenceable mixing effects, turbulences, changes in direction of the material, etc. can be adjusted.

These objects are achieved according to the present invention by the following: (a) the scraper fingers are cylindrical pin bodies, which are flattened or partly recessed in the direction from the screw shaft up to close to an end face lying opposite to the screw shaft, (b) the flats or recesses amount up to 85 percent, and particularly between 45 and 70 percent, of the area of cross-section of the cylindrical pin bodies, (c) the cylindrical pin bodies comprise at least one center bore and, extending out from the center bore, at least one side bore with an exit into the screw space, and (d) the cylindrical pin bodies are rotatable around their longitudinal axes. The cylindrical bodies preferably have a circular area of cross-section, but they can also reveal a polygonal or an elliptical area of cross-section.

The flats or recesses predominantly extend smoothly up to the end faces of the pin bodies, but they can also have an asymptotic convergence to the end faces of the pin bodies, the degree of flattening increasing up to the end face. Also, the recesses can be so designed that sickle-shaped or lunulate bodies are formed, the greatest surface of which is opposite to the advanced material. For reasons of stability and housing the bores, the recess should not amount to more than 85 percent of the total area of cross-section. There are practically no lower margins, but this will be at the expense of the increasing weight of the pin bodies. For the purpose of introducing a fluid during operation, there is provided a longitudinal bore which preferably joins into transverse side bores. The number of side bores is optional. The direction of the side bores can be distributed over the entire circumferences of the pin bodies and over their entire heights or lengths. However, preferably the side bores are located so that they are disposed opposite to the direction of advance of the material.

The cylindrical pin bodies are affixed in such a manner at or in the jacket of the screw space, for example, an extruder wall, that it is possible to pivot them around their axes from outside the extruder wall. In such a manner, it is possible that, without interrupting operation, both the direction of the introduction of fluides through the transverse bores can be varied and the surface of the pin bodies opposite to the advanced material can be altered. Furthermore, it has proved expedient when the pin bodies provided with flats or recesses are in addition twisted. Owing to this, there result particularly effective turbulences which further enhance the desired mixing and breaking effect. Further details, features of construction and particularly advantageous embodiments of the scraper fingers according to the present invention in apparatus for the extrusion, expansion and/or thermic treatment of substances and substance mixtures are derivable from the attached drawings.

DETAILED DESCRIPTION OF THE PREFERRED EMBODIMENT

Figure 1:
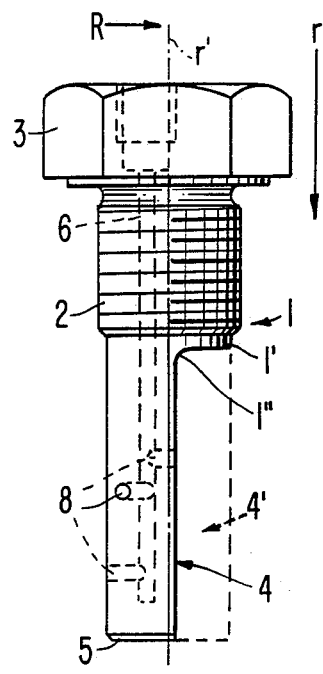
FIG. 1 is an elevation of one embodiment of a scraper finger according to the present invention.
Figure 2:
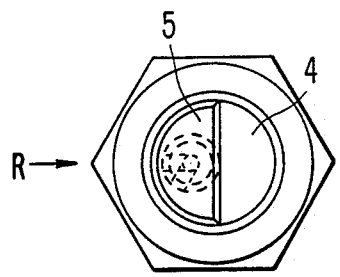
FIG. 2 is a bottom view of the scraper finger of FIG. 1.

As is revealed by FIGS. 1 and 2, the scraper finger or cylindrical pin body, which is designated generally by the reference numeral 1, comprises an upper part 1' taking up the full surface area of cross-section of the pin body and a part 4 having a recess 4' recessed or flattened, respectively, in a direction toward the bottom surface. In the illustrated example, the pin body 1 at first has a fully circular habit 1' which at 1" passes over to the remaining part 4 having an area of cross-section of the shape of circular segments. The pin body 1 is fixed to or in the jacket of the screw space by a suitable auxiliary arrangement such as, e.g., a pipe thread 2 and a nut or screw head 3. By means of a bore 6, which preferably extends through the pin body 1 up to a point close to the lower edge of the pin body, there can be introduced a fluid, e.g., steam, or also a gas, such as $CO_2$, air, oxygen, etc. This fluid is distributed through predominantly horizontal side bores 8 in different directions within the screw space or introduced into the material to be treated. The radial alignment of the scraper finger from the wall of the screw space to the shaft of the screw is designated by r.

Figure 3:
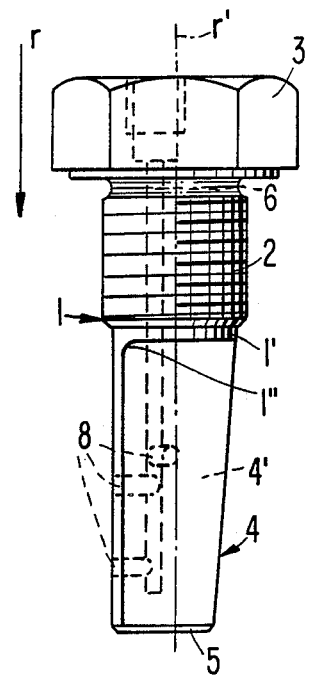
FIG. 3 is an elevation of the scraper finger of FIG. 1, partially rotated relative to the showing of FIG. 1.
Figure 4:
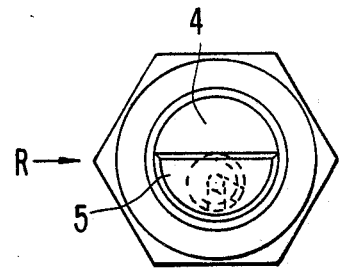
FIG. 4 is a bottom view of the scraper finger of FIG. 3.
Figure 5:
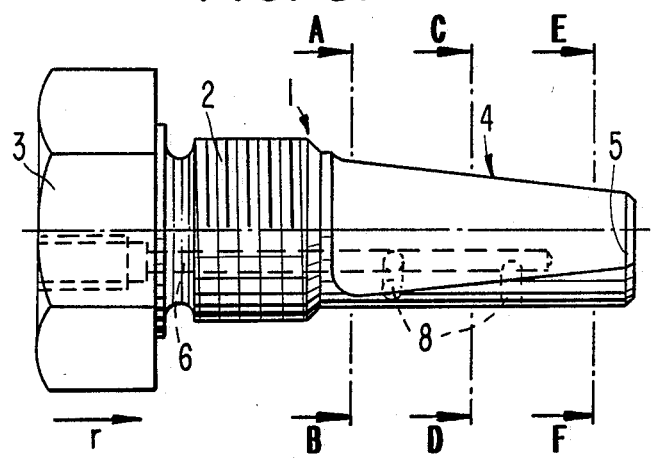
FIG. 5 is a front view of another, twisted embodiment of a scraper finger according to the present invention.
Figure 6:
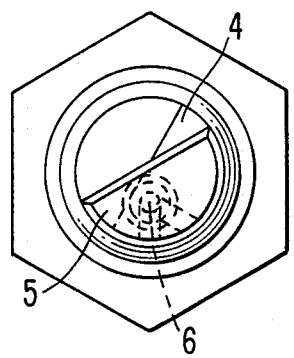
FIG. 6 is a right end view of the scraper finger of FIG. 5.
Figure 7:
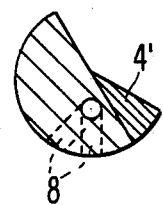
FIG. 7 is a cross-section taken along the line A-B in FIG. 5.
Figure 8:
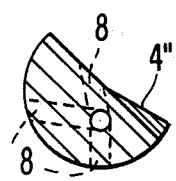
FIG. 8 is a cross-section taken along the line C-D in FIG. 5.
Figure 9:
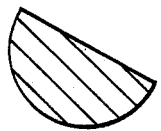
FIG. 9 is a cross-section taken along the line E-F in FIG. 5.

FIGS. 3 and 4 show the same scraper finger or pin body 1 as FIG. 1, after partial rotation around the axis r'. The recess or flattened part 4' of the pin body 1 is clearly evident. Since the greatest remaining surface of the pin body 1 is transverse to the advance direction R of the material to be treated, the surface facing the material is decreased by the twisting partial rotation of the pin body 1 around its axis, whereby different turbulences are formed at the marginal areas or at the transition point from circular to flattened cross-section. The pin bodies can, as is shown in FIGS. 5-9, be twisted in themselves. Such twisting results in a further increase of the admixing, surface renewal and turbulence of the material. The twisting is effected preferably asymptotically and in the upper region (A-B) of FIG. 7 has the highest value 4", which will decrease in the direction toward the end face 5 (see section C-D and position 4''' of FIG. 8), and at the end face 5 merges into an end configuration as shown in FIG. 9 (section E-F).

Figure 10:
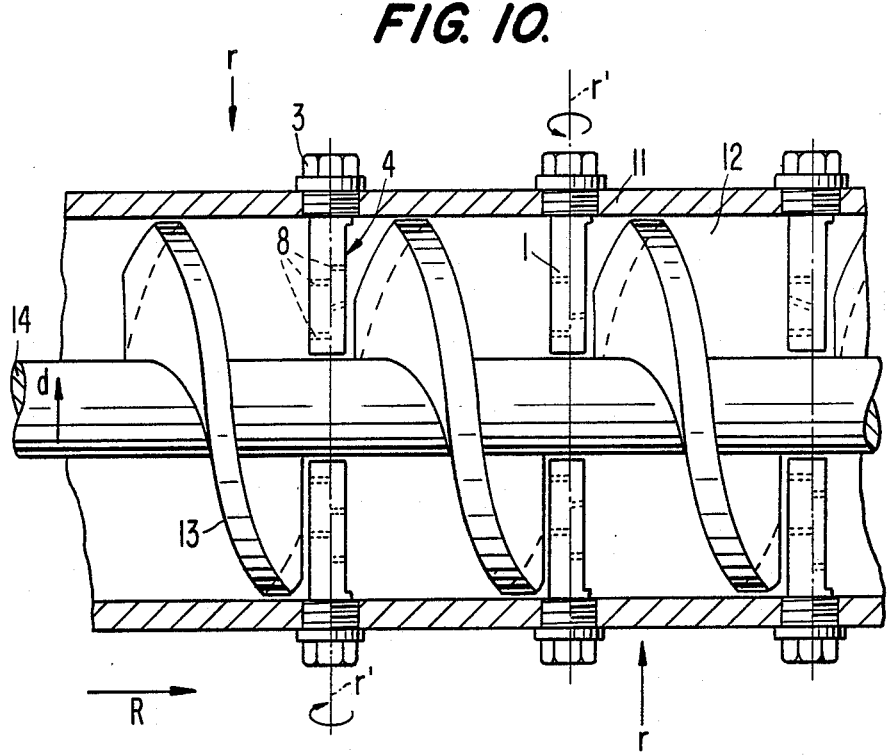
FIG. 10 is a partial cross section of a screw system employing scraper fingers according to the present invention.
Figure 11:
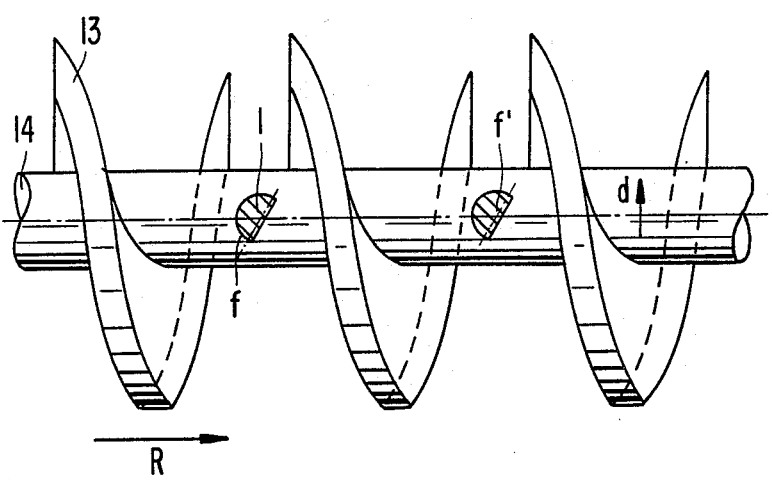
FIG. 11 is a front view of the screw from the system of FIG. 10, with an example of the scraper fingers twisted around their own axes.

As in revealed by FIG. 10, the scraper fingers 1 are set into the wall 11 of an extruder or expander or screw body in such a manner that they can be rotated from outside the wall 11, or jacket, by a suitable arrangement. The arrangements required for this purpose (levers, keys, handles, etc.) are not the subject matter of the invention as they belong to the general know-how of the process technologist. In the normal position, the non-flattened side of the finger 1 opposes the material advanced in the direction R. For the advance of the material, the screw 13 turns with a shaft 14 in a screw space 12 in the direction d (FIG. 11). The fingers 1 stand vertically or radially r with respect to the shaft 14. In the range of the fingers 1, the screw 13 is interrupted. As is shown, the side bores 8 for a fluid can extend in all directions, even declining or ascending slopingly, but preferably are oriented in the direction R of the transport of material.

Figure 12:
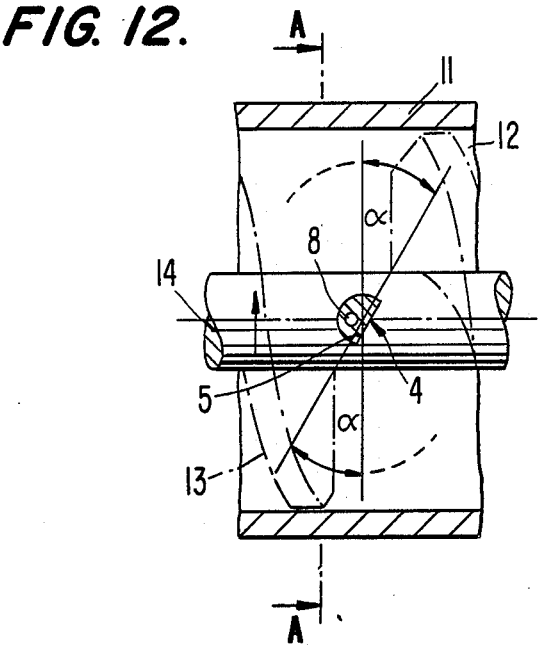
FIG. 12 shows the degree of twisting, given by angle alpha.

FIG. 12 shows the possibility of altering the position of the scraper fingers 1 in relation to the direction R of the advancing material by adjustment from the outside of the jacket 11 of the apparatus. The illustrated section of the fingers 1 reveals that the material is presented with different finger surfaces, of which those in the lower region f (FIG. 11) of the diagram level are smaller than those of the corresponding upper region f'. The twisting is, of course, possible in the reverse direction, too. The angle of rotation alpha of the rotary axis r' (compare FIGS. 1 and 3) is variable within a great range. Theoretically, it can be altered by 360 degrees, but in practical operation, it amounts to 45 degrees at most, which is the deviation from the normal radial position of the finger 1 with respect to the screw shaft 14. Preferably, the angle alpha is kept between 20 degrees and 40 degrees, wherein, of course, the characteristics of the material to be treated and the given object to be achieved (reacting, admixing, crushing, etc.) are decisive for the degree of angle (FIG. 4).

Figure 13:
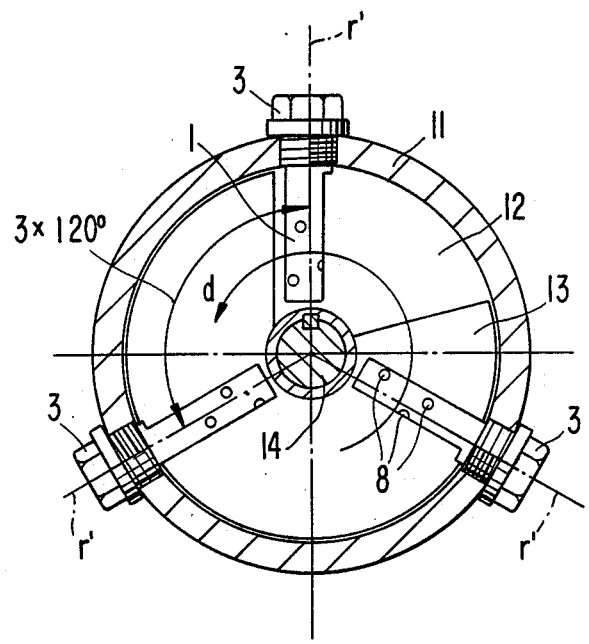
FIG. 13 is a cross-section taken along the line A—A of FIG. 12, showing a triple row arrangement of pins.

In continuous operation, it has proven particularly advantageous when several rows of scraper fingers 1, e.g., three rows as shown in FIG. 13, are provided and the fingers 1 are symmetrically facing each other. In this case, the positioning of the fingers 1 can have different alpha values both within a row and with respect to one another, i.e., the individual fingers are twisted differently. By this, the flow of material is influenced differently and there are formed confronting mixing zones which, in the case of differing turbulences, cause a further increase of the economy of the process. In addition, there can also be provided zones with an increased number of fingers 1. This is especially applicable when, for instance, towards the end of the treatment, the risk of material agglomeration becomes greater. In this case, there are then employed several scraper fingers in a small space. This is analogously applicable as well for different twisting, i.e., different alpha angles within a row or within a zone.

It is self-evident that the configuration of the flattened scraper fingers or those provided with recesses as well as, optionally, with an additional twisting according to FIGS. 5–9 is not restricted to the illustrated examples of the drawing, but that other configurations according to the present invention can be provided which do not depart from the basic principles of the invention, namely, flattening or recessing, optionally twisting, the positioning or the twisting in the direction towards the flow of material R, the rotatability of the fingers from outside of the treatment space during continuous operation, bores for fluids, etc.

The apparatus according to the invention has hitherto proven itself in a quite outstanding manner in the thermic conditioning of oilseeds, and in the treatment, reaction and shaping of foodstuffs, feeds or even fertilizers. The measures according to the invention have proven themselves to be particularly economical (reduction in operating expenses by lowering the driving energy, improvement of quality by optimal admixing of material and reacting of the components, uniformity of the products, as well as service life of the equipment, etc.), particularly in continuous operation.

It is claim:

1. In an apparatus for extruding, expanding and/or thermally treating substance mixtures, wherein the material or the mixture to be treated is continuously advanced in a closed system equipped with a feeding screw from an inlet of the system to an outlet and in the course thereof is treated under given process conditions such as contact time, pressure, temperature, reaction components, additives, and the like, wherein for carrying out reactions, conversions or even only comingling there are provided lead-in means for fluids, and wherein scraper fingers are present which break up the material or the mixture in the course of its passage through the system and for this purpose extend from attachment on a jacket of the apparatus up to the vicinity of a rotary shaft of the screw, the improvement comprising:

each scraper finger having a pin body defining a longitudinal axis and including a recess extending in a direction toward the rotary shaft up to an end face of the pin body in the vicinity of the rotary shaft and at least one center bore and side bores issuing from said center bore, said pin body being asymmetrical with respect to the longitudinal axis; and means for mounting said scraper fingers in a casing of the apparatus for rotation from outside the apparatus around their axes during running operation of the apparatus.

2. The apparatus according to claim 1, wherein the scraper fingers are in addition twisted.

3. The apparatus according to claim 1, wherein the side bores extend transverse to said center bore.

4. The apparatus according to claim 3, wherein the scraper fingers have a rotary angle of 45 degrees.

5. The apparatus according to claim 3, wherein the scraper fingers have a rotary angle of between 20 and 40 degrees.

6. The apparatus according to claim 4, wherein the scraper fingers have a circular cross-section.

7. The apparatus according to claim 6, wherein the recesses comprise up to 85% of the area of cross-section of the scraper fingers.

8. The apparatus according to claim 7, wherein the recesses comprise between 45% and 70% of the area of cross-section of the scraper fingers.

9. An apparatus according to claim 7, wherein at least one row of scraper fingers is provided along the screw shaft.

10. An apparatus according to claim 9, wherein different regions of the apparatus have different numbers of scraper fingers.

* * * * *